(12) United States Patent
Li

(10) Patent No.: US 11,439,900 B2
(45) Date of Patent: Sep. 13, 2022

(54) PHOTOELECTRIC JOYSTICK ASSEMBLY

(71) Applicant: Dongguan Mingjian Electronic Technology Co., Ltd., Guangdong (CN)

(72) Inventor: Jianping Li, Guangdong (CN)

( * ) Notice: Subject to any disclaimer, the term of this patent is extended or adjusted under 35 U.S.C. 154(b) by 108 days.

(21) Appl. No.: 17/261,915

(22) PCT Filed: Jan. 29, 2019

(86) PCT No.: PCT/CN2019/000021
§ 371 (c)(1),
(2) Date: Jan. 21, 2021

(87) PCT Pub. No.: WO2020/077880
PCT Pub. Date: Apr. 23, 2020

(65) Prior Publication Data
US 2021/0308565 A1 Oct. 7, 2021

(30) Foreign Application Priority Data

Oct. 16, 2018 (CN) .......................... 201811202985.0

(51) Int. Cl.
*A63F 13/24* (2014.01)
(52) U.S. Cl.
CPC .................................... *A63F 13/24* (2014.09)
(58) Field of Classification Search
None
See application file for complete search history.

(56) References Cited

U.S. PATENT DOCUMENTS

| 6,445,377 | B1 * | 9/2002 | Shimomura | G05G 9/047 |
| | | | | 345/161 |
| 6,570,107 | B1 * | 5/2003 | Nishimoto | H01H 25/06 |
| | | | | 200/6 R |

(Continued)

*Primary Examiner* — James S. McClellan
*Assistant Examiner* — Peter J Iannuzzi
(74) *Attorney, Agent, or Firm* — Prakash Nama; Global IP Services, PLLC

(57) ABSTRACT

The present invention discloses a photoelectric joystick assembly composed of a joystick and a substrate, the substrate being provided with three pairs of photoelectric tubes; first and second linkage members are respectively provided with rotatable first and second luminous flux changing members at one end, thereby oscillating in the respective photoelectric tubes, respectively, so that the light received by a photosensitive element from a light-emitting element continuously changes; the second linkage member is further provided with an elastic member with a light path mechanism thereacross, which acts on communication or block of the light path of the photoelectric tubes to provide a switch signal. The solution of the present invention is to replace the mechanical contact switch and potentiometer for transmission with a photoelectric element and an original structure, and design a connection structure and manner originally, by which these photoelectric elements are arranged in the rocker masterly. Accordingly, the mechanical mechanism is separated from electricity, so as to make a coating on the substrate dustproof, waterproof and antistatic, and further, non-contact photoelectric elements prolong service life of a product greatly. The rocker assembly has wide applicability and strong practicability, and thus has broad market prospects.

8 Claims, 5 Drawing Sheets

(56) References Cited

U.S. PATENT DOCUMENTS

| | | | | |
|---|---|---|---|---|
| 6,989,497 B1* | 1/2006 | Lee | ........................ | G05G 9/047 |
| | | | | 200/6 A |
| 7,199,314 B2* | 4/2007 | Huang | ............... | G05G 9/04796 |
| | | | | 345/161 |
| 10,124,249 B2* | 11/2018 | Schmitz | ................... | A63F 13/24 |
| 2017/0199521 A1* | 7/2017 | Tang | ........................ | A63F 13/24 |
| 2018/0174783 A1* | 6/2018 | Wu | ........................ | G05G 9/047 |

* cited by examiner

PHOTOELECTRIC JOYSTICK ASSEMBLY

BACKGROUND OF THE INVENTION

The present invention relates to the technical field of electronic accessories, in particular to a joystick assembly used for game operation.

Joystick is an input device of an electronic game machine, which can realize control of simulated characters or the like in the computer by manipulating buttons and so on. The joystick has been to the mature existing technology, mainly using a contact electrical component of a mechanical mechanism, such as a contact sheet, to constitute signal triggering. The mechanical structure of such a joystick is not separated from electricity, and it is difficult to achieve dustproof, waterproof and antistatic effect of a coating on the substrate. Additionally, it is easy to wear after long-term use, which affects the service life of the product. Therefore, the present invention aims to improve the existing joystick to solve the above problems.

BRIEF SUMMARY OF THE INVENTION

In view of the above-mentioned problems, the present invention aims to provide a non-contact joystick assembly having photoelectric elements to constitute signal triggering, which can carry out functions of a potentiometer and a push switch.

In order to achieve this technical purpose, the solution of the present invention is: a photoelectric joystick assembly composed of a joystick and a substrate, the joystick being installed on the substrate; the joystick comprising: a base, an upper cover, a handle member, a rocker member, a rocker seat, a first linkage member, a second linkage member, and a reset spring, the handle member being connected to the rocker member, the first linkage member and the second linkage member being arranged crosswise between the rocker member and the rocker seat, and the reset spring being arranged between the rocker seat and the base, characterized in that the substrate is provided with three pairs of photoelectric tubes, namely a first pair of photoelectric tubes, a second pair of photoelectric tubes, and a third pair of photoelectric tubes, each pair of photoelectric tubes being composed of a light-emitting element and a photosensitive element, wherein one end of the first linkage member is provided with a first luminous flux changing member, the first pair of photoelectric tubes corresponding to the first luminous flux changing member, and the first luminous flux changing member oscillates in the first pair of photoelectric tubes as the first linkage member rotates such that the light received by the photosensitive element from the light-emitting element constantly changes; one end of the second linkage member is provided with a second luminous flux changing member, the second pair of photoelectric tubes corresponding to the second luminous flux changing member, and the second luminous flux changing member oscillates in the second pair of photoelectric tubes as the second linkage member rotates such that the light received by the photosensitive element from the light-emitting element constantly changes; and the second linkage member is further provided with an elastic member thereacross, a head end of the elastic member being provided with a light path structure, and the third pair of photoelectric tubes corresponding to the light path structure; and when the elastic member is pressed by the rocker member, the light path structure moves down, and when the rocker member is released, the light path structure moves up to reset, the up-and-down movement of the light path structure resulting in communication or block of the light path of the third pair of photoelectric tubes.

Preferably, the first luminous flux changing member and the second luminous flux changing member are fan-shaped light blocking sheets with an arc-shaped end, and a rotation center of the fan-shaped light blocking sheet is a center point, and the arc at the end of the fan-shaped light blocking sheet is an arc line gradually away from the center point.

Preferably, a tail end of the elastic member is secured to one end of the second linkage member where a second luminous flux changing member is arranged, and the head end of the elastic member is located at the other end of the second linkage member; and a middle portion of the elastic member is in contact with the rocker member. Preferably, the substrate comprises a circuit board, and the photoelectric tubes are surface mounted on the circuit board.

Preferably, the elastic member is an elastic reed or an elastic steel wire.

Preferably, the light-emitting element and the photosensitive element of the third pair of photoelectric tubes are arranged opposite to each other, and the light path structure is a light-blocking board, which realizes the photoelectric tubes' communication or block of the light path as the elastic member moves up and down.

Preferably, the light-emitting element and the photosensitive element of the third pair of photoelectric tubes are arranged on the same side, and the light path structure is a reflector, which realizes the photoelectric tubes' communication or block of the light path as the elastic member moves up and down.

Preferably, the substrate is provided with a plurality of jacks, the bottom of the base is provided with snaps corresponding to the jacks, the base being secured to the substrate by inserting the snaps into the jacks.

The solution of the present invention is to replace the mechanical contact switch and potentiometer for transmission with a photoelectric element and an original structure, and design a connection structure and manner originally, by which these photoelectric elements are arranged in the rocker masterly. Because of the photoelectric joystick of the present invention, the mechanical mechanism is separated from electricity, so as to make a coating on the substrate dustproof, waterproof and antistatic, and further, non-contact photoelectric elements prolong service life of a product greatly. The rocker assembly of the present creation has wide applicability and strong practicability, and thus has broad market prospects.

DETAILED DESCRIPTION OF THE INVENTION

The present invention will be further explained below in conjunction with the drawings and embodiments. In the following detailed description, some exemplary embodiments of the present invention are merely described by way of illustration. Undoubtedly, those skilled in the art may realize that the described embodiments can be modified in various ways without departing from the spirit and scope of the present invention. Therefore, the drawings and description are illustrative in nature, rather than limiting the protection scope of the claims.

Figure 1:
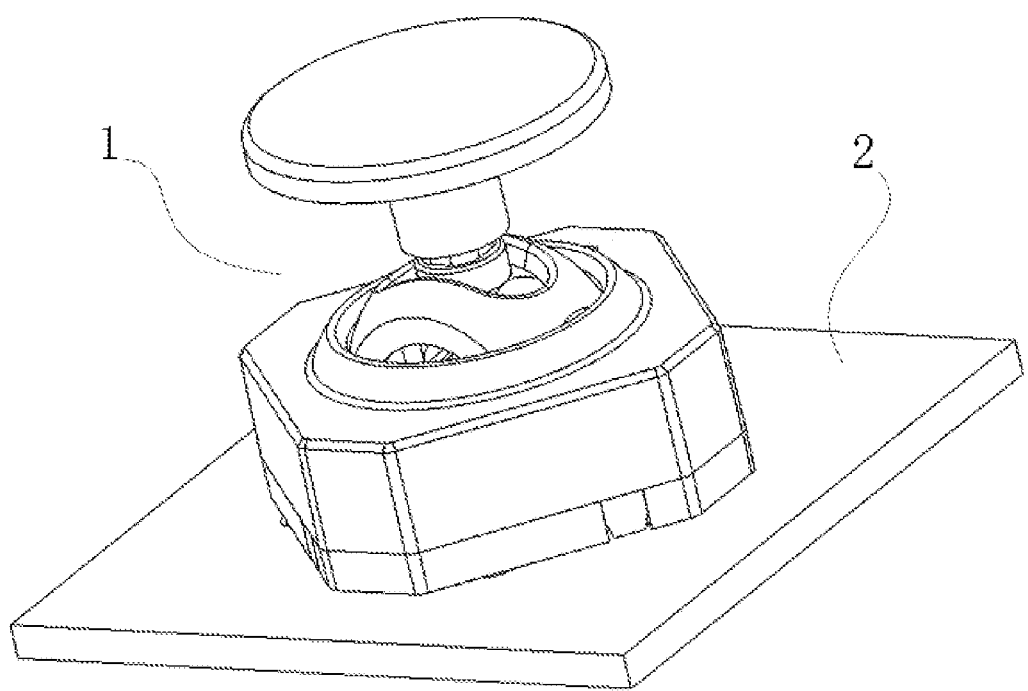
FIG. 1 is an overall schematic diagram of the specific embodiment.
Figure 2:
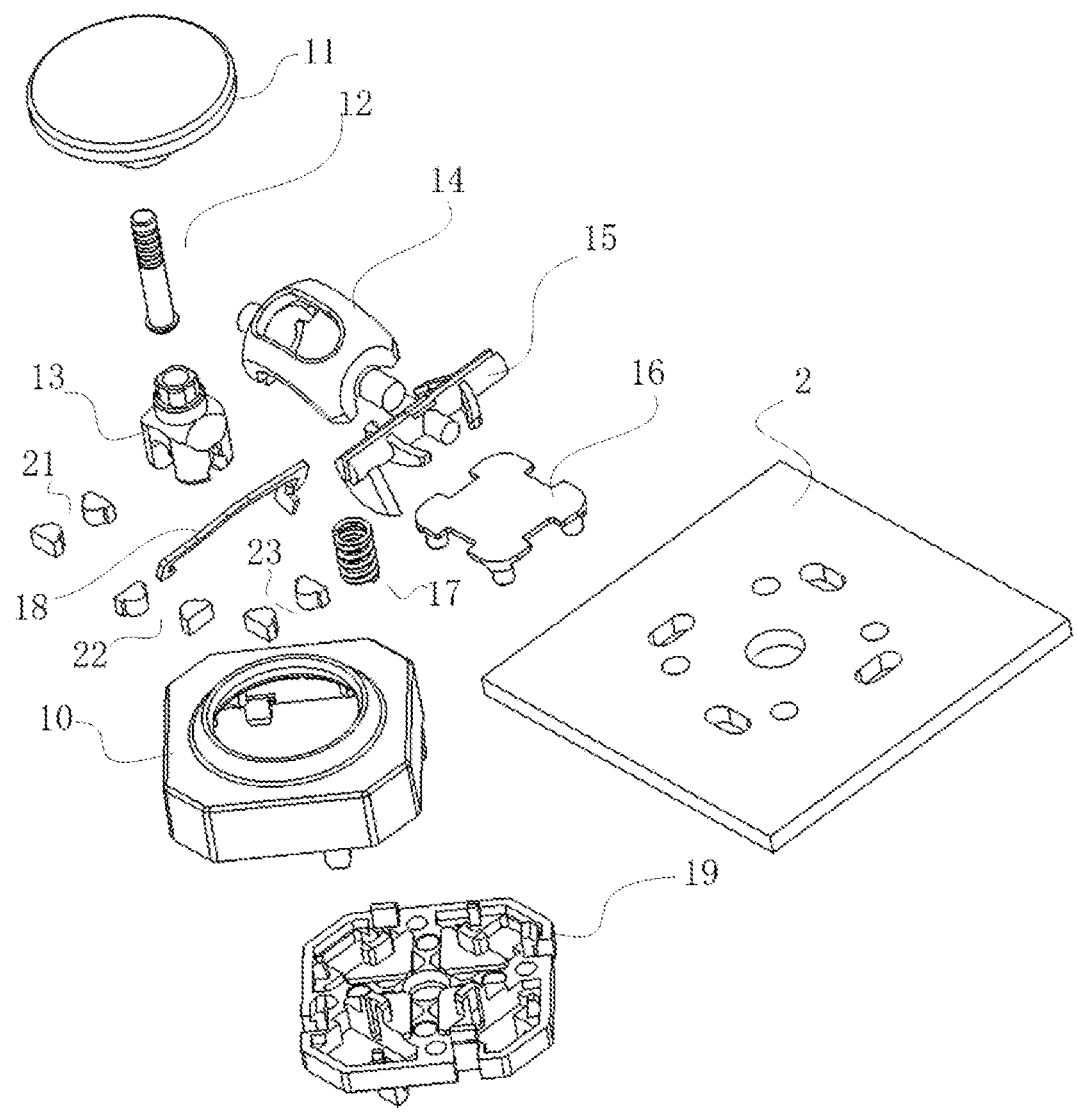
FIG. 2 is an exploded view of the structure of the specific embodiment.

The photoelectric joystick assembly of the present invention is suitable for control of electronic games, which can provide front, rear, left, and right oscillation control and signal output controlled by pressing. As shown in FIGS. 1 and 2, the photoelectric joystick assembly of the present invention is composed of a joystick 1 and a substrate 2 including a circuit board, the joystick 1 being installed on the substrate 2. For the main structural parts, they are all commonly used technologies of the existing rocker components, for example, the joystick comprises a base 19, an upper cover 10, a handle member (composed of a handle 11 and a handle link 12), a rocker member 13, a rocker seat 16, a first linkage member 14, a second linkage member 15, and a reset spring 17, the handle member being connected to the rocker member 13, the first linkage member 14 and the second linkage member 15 being arranged crosswise between the rocker member 13 and the rocker seat 16, and the reset spring 17 being arranged between the rocker seat 16 and the base 19. The specific structure, action and function of these structural parts are all extremely mature prior art, which are not described in details herein. The innovation of the present patent resists in improving these prior art creatively.

Figure 3:
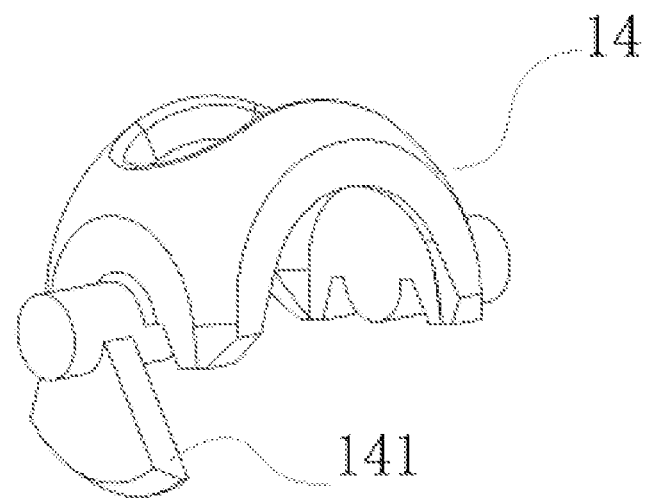
FIG. 3 is the first view of the first linkage member in the specific embodiment.
Figure 4:
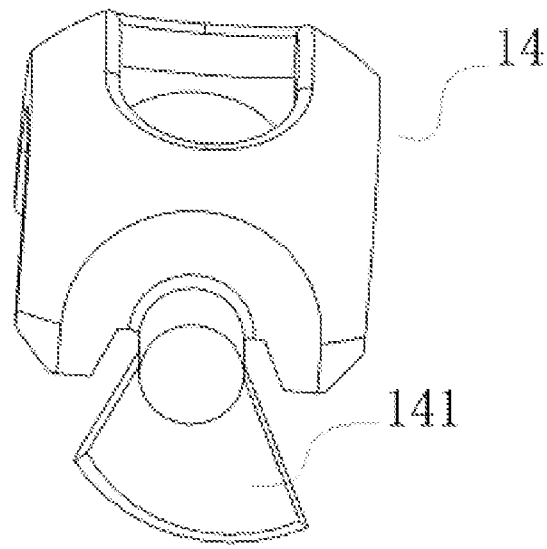
FIG. 4 is the second view of the first linkage member in the specific embodiment.

The photoelectric joystick assembly according to the present invention is mainly characterized in the following: the substrate 2 as used is provided with three pairs of photoelectric tubes, namely a first pair of photoelectric tubes 21, a second pair of photoelectric tubes 22, and a third pair of photoelectric tubes 23, each pair of photoelectric tubes being composed of a light-emitting element and a photosensitive element. In the preferred embodiment, the photoelectric tubes are mounted on the circuit of the substrate by means of surface mounting, and these photoelectric tubes are matched with the up-and-down movement action of the corresponding light path mechanism and the oscillation action of the luminous flux changing member to provide corresponding rocker signals, such as potential change signals and switch signals, to the device via conversion.

Wherein one end of the first linkage member 14 is provided with a first luminous flux changing member 141, the first pair of photoelectric tubes 21 corresponding to the first luminous flux changing member 141, and the first luminous flux changing member 141 oscillates in the first pair of photoelectric tubes 21 as the first linkage member 14 rotates such that the light received by the photosensitive element from the light-emitting element constantly changes. In the specific embodiment of the present invention, the first luminous flux changing member 141 is a fan-shaped light blocking sheet with an arc-shaped end. As shown in FIGS. 3 and 4, with a rotation center of the fan-shaped light blocking sheet as a center point, the arc at the end of the fan-shaped light blocking sheet is an arc line gradually away from the center point. Such structure may be used to carry out the function of a potentiometer. This fan-shaped light blocking sheet with a specific arc line can oscillate around the rotation center between the first pair of photoelectric tubes when the first linkage member is oscillated by the handle member. Because of the oscillation of the fan-shaped light blocking sheet, the light emitted from the light-emitting element is gradually blocked or exposed such that the corresponding photosensitive element can receive the gradually changing light to obtain different luminous fluxes and thereby output the corresponding potential change signal, and finally realize the output of different signals in light of the amplitude of the hand crank during user's operation, thereby controlling the corresponding software.

Figure 5:
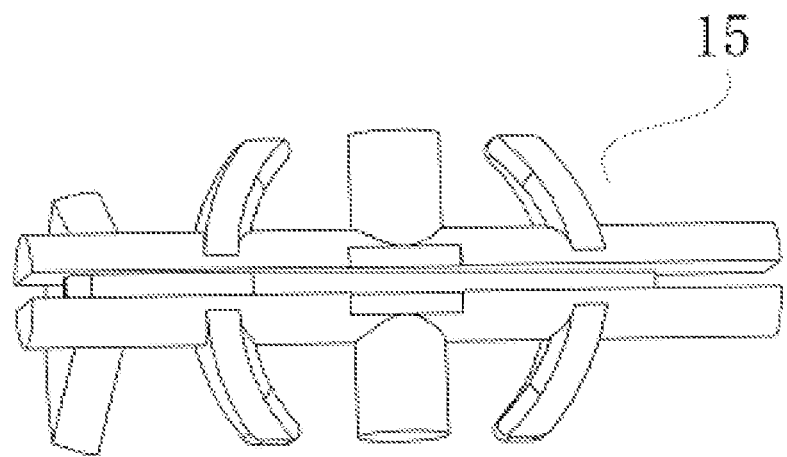
FIG. 5 is the first view of the second linkage member in the specific embodiment.
Figure 6:
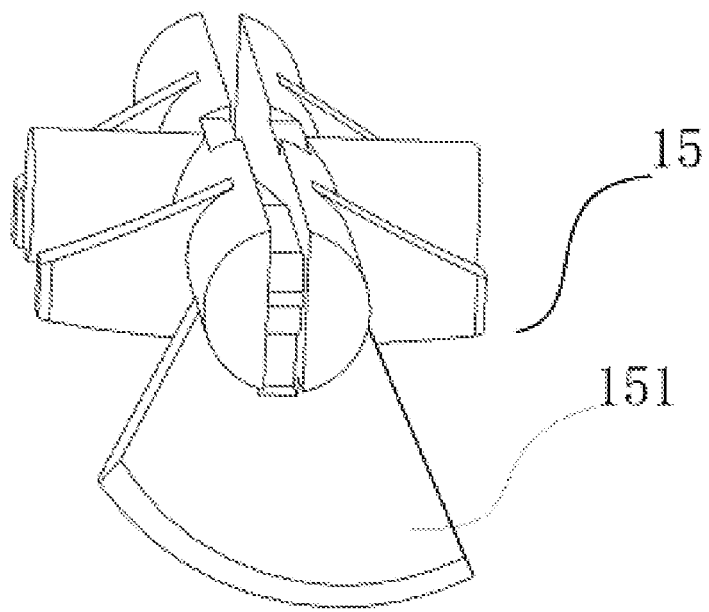
FIG. 6 is the second view of the second linkage member in the specific embodiment.

Similarly, one end of the second linkage member 15 is provided with a second luminous flux changing member 151. As shown in FIGS. 5 and 6, the second pair of photoelectric tubes 22 correspond to the second luminous flux changing member 151, and the second luminous flux changing member 151, along with the rotation of the second linkage member 15, oscillates in the second pair of photoelectric tubes 22 such that the light received by the photosensitive element from the light-emitting element changes continuously. In the specific embodiment of the present invention, the second luminous flux changing member 151 is a fan-shaped light blocking sheet with an arc-shaped end. With a rotation center of the fan-shaped light blocking sheet as a center point, the arc at the end of the fan-shaped light blocking sheet is an arc line gradually away from the center point. Such structure may be used to carry out the function of a potentiometer. This fan-shaped light blocking sheet with a specific arc line can oscillate around the rotation center between the second pair of photoelectric tubes when the second linkage member is oscillated by the handle member. Because of the oscillation of the fan-shaped light blocking sheet, the light emitted from the light-emitting element is gradually blocked or exposed such that the corresponding photosensitive element can receive the gradually changing light to obtain different luminous fluxes and thereby output the corresponding potential change signal, and finally realize the output of different signals in light of the amplitude of the hand crank during user's operation, thereby controlling the corresponding software.

It should be noted that the first and second luminous flux changing members of the present invention, in addition to the gradual arc fan-shaped light blocking sheet in this embodiment, can also be any other structure or method capable of realizing luminous flux change, such as a light guiding sheet, and a reflective sheet. As long as the effect of acquiring luminous flux change together with the oscillation of linkage members can be achieved, it can be deemed as an equivalent replacement of the technical features of the present invention.

Figure 7:
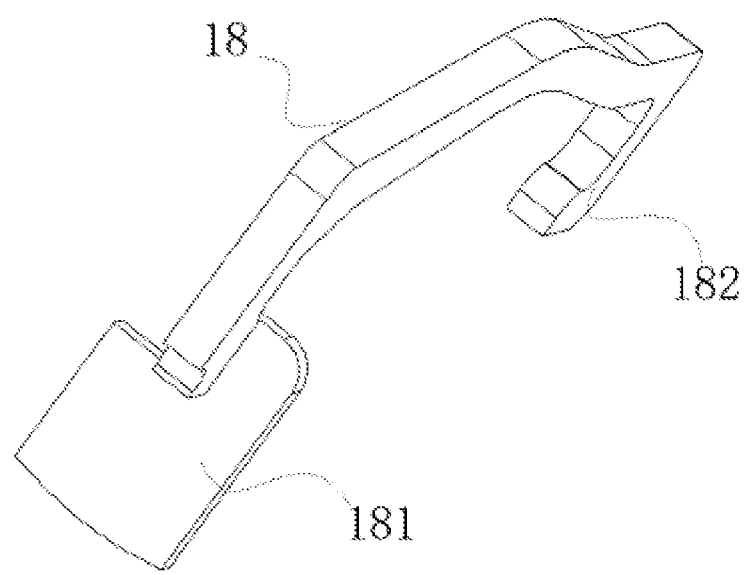
FIG. 7 is a three-dimensional view of the elastic member in the specific embodiment.

In addition to obtaining the potential change signal, the joystick assembly of the present invention further obtains a pressing switch signal. In order to achieve this function, in the specific embodiment of the present invention, the second linkage member 15 is further provided with an elastic member 18 thereacross. As shown in FIGS. 2 and 7, a tail end 182 of the elastic member 18 is secured to one end of the second linkage member 15 where a second luminous flux changing member is arranged, and a head end of the elastic member 18 is located at the other end of the second linkage member; the head end of the elastic member 18 is provided with a light path structure 181 corresponding to a third pair of photoelectric tubes 23 on the substrate; and a middle portion of the elastic member 18 is in contact with a rocker member 13; when the elastic member 18 is pressed by the rocker member, the light path structure moves down, and when the rocker member 13 is released, the light path structure moves up to reset, the up-and-down movement of the light path structure resulting in communication or block of the light path of the photoelectric tubes, thereby obtaining on-and-off switch signals.

In the specific applications, the light-emitting element and the photosensitive element of the photoelectric tubes are arranged opposite to each other, and the light path structure is designed as a light-blocking board or a light-transmitting hole, which realizes the photoelectric tubes' communication or block of the light path as the elastic member moves up and down, thereby realizing the switching function. It can also be another specific embodiment, that is, the light-emitting element and the photosensitive element of the of photoelectric tubes are arranged on the same side, and the light path structure is a reflector, which realizes the photoelectric tubes' communication or block of the light path as the elastic member moves up and down. This specific embodiment is not shown in this article, but this does not affect the understanding and disclosure of this embodiment.

In the present invention, the light flux change of the photoelectric tubes and the light path switch are used to realize the potential change and realize the switching function based on the optical principle, which is not described in details herein, and falls into the domain of existing well-known principles.

To facilitate the connection between the joystick 1 and the substrate 2, the substrate is provided with a plurality of jacks, and the bottom of the base is provided with snaps corresponding to the jacks, the base being secured to the substrate by inserting the snaps into the jacks.

The above shows and describes the basic principles, main features and advantages of the present invention. Those skilled in the art should understand that the present invention is not limited by the foregoing embodiments, the foregoing embodiments and descriptions only illustrate the principles of the present invention, and moreover, without departing from the spirit and scope of the present invention, the present invention will have various changes and improvements, which changes and improvements would all fall into the scope of the present invention as claimed. The scope of protection claimed by the present invention is defined by the appended claims and their equivalents.

What is claimed is:

1. A photoelectric joystick assembly composed of a joystick and a substrate, the joystick being installed on the substrate; the joystick comprising: a base, an upper cover, a handle member, a rocker member, a rocker seat, a first linkage member, a second linkage member, and a reset spring, the handle member being connected to the rocker member, the first linkage member and the second linkage member being arranged crosswise between the rocker member and the rocker seat, and the reset spring being arranged between the rocker seat and the base, characterized in that the substrate is provided with three pairs of photoelectric tubes, namely a first pair of photoelectric tubes, a second pair of photoelectric tubes, and a third pair of photoelectric tubes, each pair of photoelectric tubes being composed of a light-emitting element and a photosensitive element, wherein one end of the first linkage member is provided with a first luminous flux changing member, the first pair of photoelectric tubes corresponding to the first luminous flux changing member, and the first luminous flux changing member oscillates in the first pair of photoelectric tubes as the first linkage member rotates such that the light received by the photosensitive element from the light-emitting element constantly changes;

one end of the second linkage member is provided with a second luminous flux changing member, the second pair of photoelectric tubes corresponding to the second luminous flux changing member, and the second luminous flux changing member oscillates in the second pair of photoelectric tubes as the second linkage member rotates such that the light received by the photosensitive element from the light-emitting element constantly changes; and the second linkage member is further provided with an elastic member thereacross, a head end of the elastic member being provided with a light path structure, and the third pair of photoelectric tubes corresponding to the light path structure; and when the elastic member is pressed by the rocker member, the light path structure moves down, and when the rocker member is released, the light path structure moves up to reset, the up-and-down movement of the light path structure resulting in communication or block of the light path of the third pair of photoelectric tubes.

2. The photoelectric joystick assembly according to claim 1, characterized in that the first luminous flux changing member and the second luminous flux changing member are fan-shaped light blocking sheets with an arc-shaped end, and a rotation center of the fan-shaped light blocking sheet is a center point, and the arc at the end of the fan-shaped light blocking sheet is an arc line gradually away from the center point.

3. The photoelectric joystick assembly according to claim 1, characterized in that a tail end of the elastic member is secured to one end of the second linkage member where a second luminous flux changing member is arranged, and the head end of the elastic member is located at the other end of the second linkage member; and a middle portion of the elastic member is in contact with the rocker member.

4. The photoelectric joystick assembly according to claim 1, characterized in that the substrate comprises a circuit board, and the photoelectric tubes are surface mounted on the circuit board.

5. The photoelectric joystick assembly according to claim 1, characterized in that the elastic member is an elastic reed or an elastic steel wire.

6. The photoelectric joystick assembly according to claim 1, characterized in that the light-emitting element and the photosensitive element of the third pair of photoelectric tubes are arranged opposite to each other, and the light path structure is a light-blocking board, which realizes the photoelectric tubes' communication or block of the light path as the elastic member moves up and down.

7. The photoelectric joystick assembly according to claim 1, characterized in that the light-emitting element and the photosensitive element of the third pair of photoelectric tubes are arranged on the same side, and the light path structure is a reflector, which realizes the photoelectric tubes' communication or block of the light path as the elastic member moves up and down.

8. The photoelectric joystick assembly according to claim 1, characterized in that the substrate is provided with a plurality of jacks, and the bottom of the base is provided with snaps corresponding to the jacks, the base being secured to the substrate by inserting the snaps into the jacks.

* * * * *